United States Patent
Zhang et al.

(10) Patent No.: US 9,515,881 B2
(45) Date of Patent: Dec. 6, 2016

(54) METHOD, DEVICE, AND SYSTEM FOR PACKET PROCESSING

(71) Applicant: Huawei Technologies Co., Ltd., Shenzhen (CN)

(72) Inventors: Bo Zhang, Xi'an (CN); Nan Jiang, Shenzhen (CN); Wenbo Guo, Xi'an (CN); Yong Luo, Shenzhen (CN); Xinglin Huang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 14/173,415

(22) Filed: Feb. 5, 2014

(65) Prior Publication Data
US 2014/0153442 A1   Jun. 5, 2014

Related U.S. Application Data

(63) Continuation of application No. PCT/CN2011/078056, filed on Aug. 5, 2011.

(51) Int. Cl.
*H04L 12/28* (2006.01)
*H04L 12/24* (2006.01)
(Continued)

(52) U.S. Cl.
CPC ....... *H04L 41/0853* (2013.01); *H04L 12/4675* (2013.01); *H04L 12/4679* (2013.01);
(Continued)

(58) Field of Classification Search
CPC ...... H04L 12/4641; H04L 41/26; H04L 49/70; H04L 12/04
(Continued)

(56) References Cited

U.S. PATENT DOCUMENTS 6,499,115 B1 *  12/2002  Wiedeman ............. G06F 11/26
                                                        370/252
6,741,592 B1 *   5/2004  Edsall ................. H04L 12/4641
                                                        370/389
(Continued)

FOREIGN PATENT DOCUMENTS

CN          1725731 A       1/2006
CN          1925456 A       3/2007
(Continued)

OTHER PUBLICATIONS

International Search Report received in Application No. PCT/CN2011/078056, mailed May 17, 2012, 11 pages.
(Continued)

*Primary Examiner* — Ricky Ngo
*Assistant Examiner* — Dewanda Samuel
(74) *Attorney, Agent, or Firm* — Slater Matsil, LLP

(57) ABSTRACT

The present disclosure provides a method, a device, and a system for packet processing, where the method includes: receiving a protocol packet from a downstream device, where the protocol packet carries uplink port information of the downstream device and the user VLAN of the downstream device; learning port types of the present device based on the uplink port information and classifying the user VLAN of the present device and the user VLAN of the downstream device based on the user VLAN of the downstream device; and forwarding the received packet based on configuration information stored on the present device, where the port type or types to which each VLAN type can be added are specified in the configuration information.

11 Claims, 4 Drawing Sheets

(51) Int. Cl.
*H04L 12/46* (2006.01)
*H04L 12/931* (2013.01)
*H04L 12/721* (2013.01)

(52) U.S. Cl.
CPC .............. *H04L 41/26* (2013.01); *H04L 45/66* (2013.01); *H04L 49/70* (2013.01); *H04L 41/0813* (2013.01); *H04L 41/12* (2013.01)

(58) Field of Classification Search
USPC .................................................. 370/389, 390
See application file for complete search history.

(56) References Cited

U.S. PATENT DOCUMENTS

| | | | |
|---|---|---|---|
| 7,180,899 B2* | 2/2007 | De Silva | H04L 47/2491 370/392 |
| 7,385,973 B1 | 6/2008 | Johnson et al. | |
| 7,633,956 B1* | 12/2009 | Parandekar | H04L 12/2859 370/351 |
| 8,369,344 B1* | 2/2013 | Krishnan | H04L 63/0236 370/389 |
| 2004/0042416 A1 | 3/2004 | Ngo et al. | |
| 2006/0002311 A1 | 1/2006 | Iwanaga et al. | |
| 2007/0097972 A1* | 5/2007 | Jain | H04L 12/4641 370/392 |
| 2008/0175251 A1* | 7/2008 | Oouchi | H04L 45/04 370/395.31 |
| 2008/0219173 A1* | 9/2008 | Yoshida | H04L 43/50 370/241.1 |

FOREIGN PATENT DOCUMENTS

| | | |
|---|---|---|
| CN | 101056246 A | 10/2007 |
| CN | 101083570 A | 12/2007 |

OTHER PUBLICATIONS

Extended European Search Report in EP 11 86 0387, mailed Sep. 5, 2014, 4 pages.

* cited by examiner

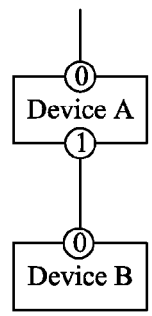
FIG. 1
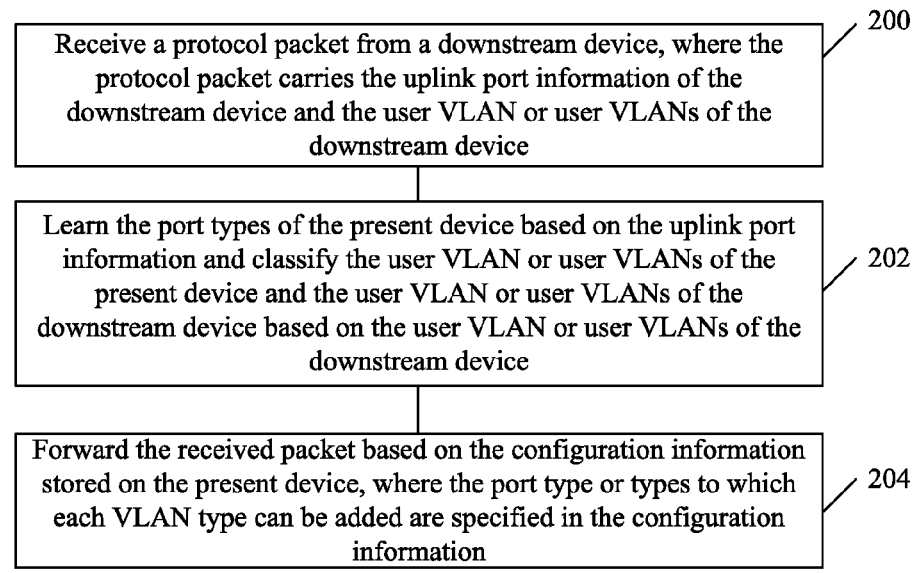
FIG. 2
FIG. 3

METHOD, DEVICE, AND SYSTEM FOR PACKET PROCESSING

This application is a continuation of International Application No. PCT/CN2011/078056, filed on Aug. 5, 2011, which is hereby incorporated by reference in its entirety.

TECHNICAL FIELD

Embodiments of the present disclosure relate to communication technologies, and in particular, to a method, a device, and a system for packet processing.

BACKGROUND

At present, a layer 2 network uses the virtual local area network (Virtual Local Area Network, VLAN) technology. A layer 2 network includes many access devices. Each access device is connected to many users, and the users are distributed into a plurality of VLANs.

In the layer 2 network, an Ethernet packet is forwarded based on VLAN information and Media Access Control (Media Access Control, MAC) address information. Therefore, each access device needs to know the VLAN or VLANs to which each port of the device is connected and the MAC address of another device to which the port is connected. For configuration of the VLAN information for each port of an access device, the manual configuration manner is used at present.

For a large-size layer 2 network, because the network topology is complicated, the configuration of the VLAN information is of high complexity. If the manual configuration method is used, the risk of a configuration error is high, which may lead to service faults in the layer 2 network. Moreover, because the network topology often changes and the VLAN information to be configured often changes accordingly and therefore requires reconfiguration by an operator each time it changes, manual configuration is of poor feasibility in an actual application. When the Spanning Tree Protocol (Spanning Tree Protocol, STP) is used for a layer 2 network, the network topology is changed through an STP algorithm, but the physical connection between each two access devices in the layer 2 network does not change. Then the operator cannot know the topology change while it takes place and therefore cannot perform reconfiguration. In a word, the existing method of manual configuration of the VLAN information for an access device is of low accuracy and poor feasibility.

SUMMARY OF THE INVENTION

An embodiment of the present disclosure provides a method for packet processing including receiving a protocol packet from a downstream device, where the protocol packet carries uplink port information of the downstream device and the user VLAN of the downstream device, learning port types of the present device based on the uplink port information, and classifying the user VLAN of the present device and the user VLAN of the downstream device based on the user VLAN of the downstream device, and forwarding the received packet based on configuration information stored on the present device, where the port type or types to which each VLAN type can be added are specified in the configuration information.

An embodiment of the present disclosure further provides a device for packet processing including a packet receiving unit, configured to receive a protocol packet from a downstream device, where the protocol packet carries uplink port information of the downstream device and the user VLAN of the downstream device, a learning unit, configured to learn port types of the present device based on the uplink port information and classify the user VLAN of the present device and the user VLAN of the downstream device based on the user VLAN of the downstream device, and a packet processing unit, configured to forward the received packet based on configuration information stored on the present device, where the port type or types to which each VLAN type can be added are specified in the configuration information.

An embodiment of the present disclosure further provides a system for packet processing including a first device, configured to send a protocol packet to a second device, where the protocol packet carries uplink port information of the first device and user VLAN of the first device, and a second device, configured to learn port types of the second device based on the uplink port information, classify the user VLAN of the second device and the user VLAN of the first device based on the user VLAN of the first device, and forward the received packet based on configuration information stored on the second device, where the port type or types to which each VLAN type can be added are specified in the configuration information.

In the method, device, and system provided by the embodiments of the present disclosure, port types can be automatically learned and VLAN can be automatically classified, which reduces manual intervention, and after the port types are obtained and the VLAN are classified, VLAN information that can be added to each port type is configured based on delivered network configuration, which can optimize network performance.

BRIEF DESCRIPTION OF THE DRAWINGS

To illustrate the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

FIG. 1 is a structural diagram of a network according to an embodiment of the present disclosure;

FIG. 2 is a flowchart of a method according to an embodiment of the present disclosure;

FIG. 3 is a structural diagram of a protocol packet according to an embodiment of the present disclosure;

DETAILED DESCRIPTION OF ILLUSTRATIVE EMBODIMENTS

Figure 4:
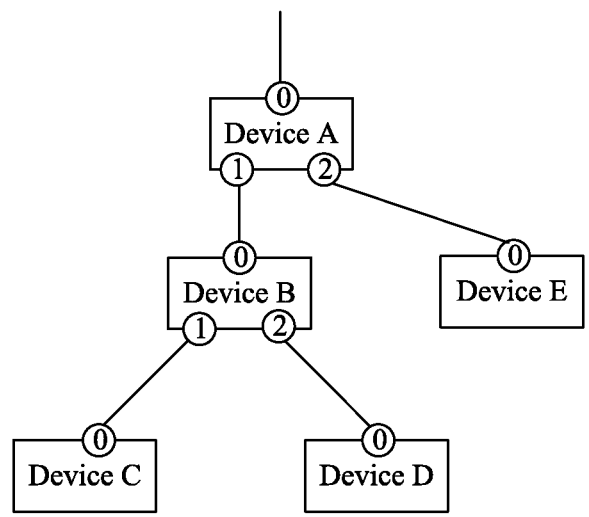
FIG. 4 is an architecture diagram of a tree network according to an embodiment of the present disclosure.

To make the objectives, technical solutions, and advantages of the embodiments of the present disclosure more clear, the following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Before the solutions of the present disclosure are described, some definitions used in the embodiments of the present disclosure are described.

The port types used in the embodiments of the present disclosure include:

1) User port (User Port): port on a present device that is connected to a device on a user side, which may be obtained through the physical connections on the device.

2) Uplink port (Uplink Port): port on a present device that is connected to an upper layer device.

3) Cascade port (Cascade Port): port on a present device that is connected to a downstream device.

The VLAN types used in the embodiments of the present disclosure include:

1) Local VLAN: VLAN only used by users of a present device.

2) Across VLAN: VLAN not used by users of a present device but used by users of a downstream device.

3) Common VLAN: VLAN used by both users of a present device and users of a downstream device.

Other definitions used in the embodiments of the present disclosure include:

1) The bottom device: device at the bottom of a network. Such a device has only one port that is in an Up or Forwarding state and can enable the solution of an embodiment of the present disclosure (in an STP network).

2) The topmost device: device at the top of a network, which may be a root bridge device in an STP loop network.

3) Downstream VLAN: All downstream devices are abstracted as a logical device. The downstream VLAN information is a set of VLAN used by the downstream devices. A present device may act as an agent for the downstream devices to report the VLAN information to a upper layer devices of the present device.

4) User VLAN: set of VLAN used by devices on a user side of a present device.

To illustrate the foregoing definitions more clearly, the following example is given for description, as shown in FIG. 1:

It is assumed that users connected to a device A use a VLAN10 and a VLAN30 and users connected to a device B use the VLAN10 and a VLAN20. In such a case, for the device A, the VLAN30 is a Local VLAN, the VLAN20 is an Across VLAN, and the VLAN10 is a Common VLAN. On the device A, a port 0 is an Uplink Port, and a port 1 is a Cascade Port. Downstream VLAN information of the device A is the VLAN10, the VLAN20, and the VLAN30. The device B is the bottom device.

An embodiment of the present disclosure provides a method for packet processing, which, as shown in FIG. 2, includes:

Step 200: Receive a protocol packet from a downstream device, where the protocol packet carries uplink port information of the downstream device and the user VLAN of the downstream device.

The protocol packet in this embodiment may be a slow protocol packet, such as a bridge protocol data unit (BPDU) packet. Its structure may be shown in FIG. 3.

In a packet of this type, the destination MAC address is 0180c20002, the protocol type is 0x8809, the protocol subtype is 6, the packet carries no VLAN tag, and the following carries information in a CLV format; the CODE consists of 4 bytes, which indicates a type of the information in the CLV format, and the LEN consists of 4 bytes, which indicates a length of the information in the CLV format; the VALUE is actual content, which is a bridge MAC address of a sending device when the CODE is 0101, a management IP address of the sending device when the CODE is 0102, downstream VLAN (including Local VLAN, Common VLAN, and Across VLAN) of the sending device when the CODE is 0103, where a VLAN mask consists of 512 bytes, which is 4096 bits in total, and from the lowest bit to the highest bit, each bit represents a corresponding VLAN ID, an Uplink Port of the sending device when the CODE is 0104, and reserved when the CODE is any other value.

Step 202: Learn port types of the present device based on the uplink port information and classify the user VLAN of the present device and the user VLAN of the downstream device based on the user VLAN of the downstream device.

Specifically, when the type of the local port is being learned, it is learned that the port on the present device that is connected to the uplink port is a Cascade Port.

Based on the physical connections on the present device, a User Port list on the present device may be obtained, and a remaining port in the Up state is an Uplink Port.

During classification of the VLAN, the user VLAN of the present device may be compared with the user VLAN of the downstream device, and the types of the user VLAN of the present device and the user VLAN of the downstream device are identified, including: a VLAN only used by users of a present device is a Local VLAN, a VLAN not used by users of a present device but used by users of a downstream device is an Across VLAN, and a VLAN used by both users of a present device and users of a downstream device is a Common VLAN.

Parameters that need to be reserved on each device in this embodiment include:

1) downstream adjacency relationship: (Cascade Port) {MAC address and IP address of a downstream adjacent bridge, uplink port of a downstream adjacent bridge};

2) user VLAN information;

3) port list: {Uplink Port, Cascade Port, User Port}; and

4) VLAN list: (Cascade Port) {Local VLAN, Common VLAN, Across VLAN}.

Step 204: Forward the received packet based on configuration information stored on the present device, where the port type or types to which each VLAN type can be added are specified in the configuration information.

The configuration information in this embodiment may be delivered by an upper layer device or by a network management device, which may specifically include:

adding a Local VLAN to an Uplink Port, and adding an Across VLAN and a Common VLAN to a corresponding Uplink Port and Cascade Port.

After the port type or types to which each VLAN type can be added are configured, a port of a corresponding type only receives a packet carrying the corresponding VLAN type.

In the configuration information, the port type attributes may further be specified, which includes configuring layer 2 isolation between a Cascade Port and a User Port and/or disabling the function of a Cascade Port of learning the MAC address of an Across VLAN.

The configuration information may further include only receiving a packet, from a User Port or an Uplink Port, carrying a Common VLAN or a Local VLAN.

A device in this embodiment may be an access device and may further be a routing device or other devices.

To clearly illustrate the present disclosure, the following describes the port type learning and VLAN classifying process of this embodiment in detail by using a tree network in FIG. 4.

In FIG. 4, it is assumed that user VLAN of a device A are 10 and 100, user VLAN of a device B are 20 and 100, user VLAN of a device C are 30 and 100, user VLAN of a device D are 40 and 100, and user VLAN of a device E are 50 and 100.

In this embodiment, the three devices C, D, and E determine that only one port of their own is in the UP state, or that they are configured as the bottom devices. Therefore, the devices C, D, and E regard themselves as the bottom devices, and actively send protocol packets to their own Uplink Ports (0). The devices C, D, and E then send protocol packets to their own uplink ports regularly.

The port lists on the devices C, D, and E are all {0, NULL, User Port list}, where the User Port list is a set of user ports obtained by a device through physical connections.

The VLAN list on the device C is (NULL){30+100, NULL, NULL}.

The VLAN list on the device D is (NULL){40+100, NULL, NULL}.

The VLAN list on the device E is (NULL){50+100, NULL, NULL}.

It is assumed that an Uplink Port is manually configured for the device B, and then the device B actively sends to the Uplink Port a protocol packet carrying the uplink port information and user VLAN of the device B.

In this embodiment, an Uplink Port is not configured for the device B, and the device B is in a silence state. It is assumed that the device B first receives a protocol packet sent by the device C. The device B first refreshes its port list to {NULL, 1, User Port list} and VLAN list to (1){20, 100, 30}. In such a case, the device B still has two unclassified ports in the UP state, so the device B waits until it receives a protocol packet from the device D. Then the device B refreshes its port list to {0, 1+2, User Port list} and VLAN list to (1){20, 100, 30}(2){20, 100, 40}.

The device B sends a protocol packet to the Uplink Port (0), and then sends protocol packets to the Uplink Port regularly. The downstream adjacency relationship of the device B is (1){MACC, 0}(2){MACD, 0}, where MACC is the MAC address of the device C and MACD is the MAC address of the device D.

If the device A is not manually configured as the topmost device, the device A acts in the same way as the device B. In this embodiment, the device A is configured as the topmost device, and the device A is in the silence state all the time and does not send any protocol packet. It is assumed that the device A first receives a protocol packet sent by the device E. The device A first refreshes its port list to {NULL, 2, User Port list} and VLAN list to (2){10, 100, 50}. Then the device A receives a packet sent by the device B and the device A refreshes its port list to {0, 1+2, User Port list} and VLAN list to (1){10, 100, 20+30+40}(2){10, 100, 50}. The downstream adjacency relationship of the device A is (1){MACB, 0}(2){MACE, 0}, where MACB is the MAC address of the device B and MACE is the MAC address of the device E.

Figure 5:
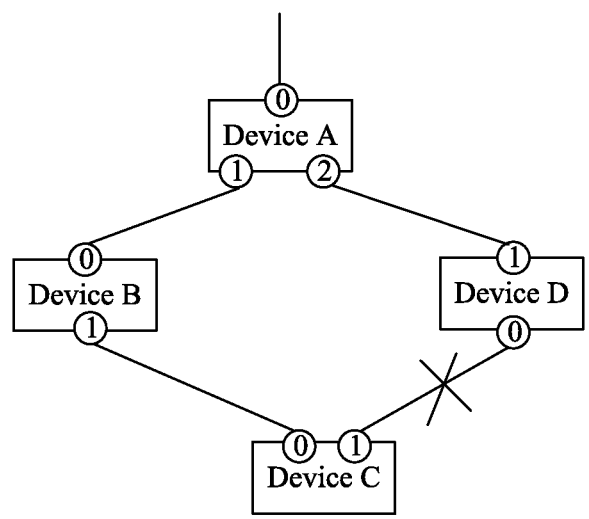
FIG. 5 is an architecture diagram of an STP network according to an embodiment of the present disclosure.

The following describes the port type learning and VLAN classifying process in STP networking, as shown in FIG. 5.

A device A is a root bridge and a port 0 of a device D is in a DISCARDING state. In the STP networking, all devices are aware that an STP root port is an Uplink Port and a specified port is a Cascade Port.

Figure 6:
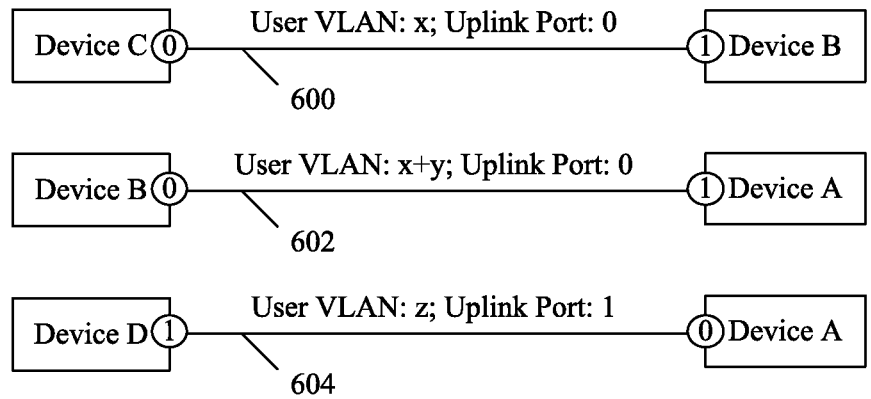
FIG. 6 is an STP-network-based flowchart according to an embodiment of the present disclosure.

The port type learning and VLAN learning process may be as shown in FIG. 6, which includes:

600: A device C sends a protocol packet to a device B, carrying a user VLAN x and Uplink Port 0 of the device C.

The device B may know, based on the protocol packet, that its port 1 is a Cascade Port and the user VLAN of the device C is x.

602: The device B sends a protocol packet to a device A, carrying user VLAN x+y and Uplink Port 0 information of the device B.

The device A may know, based on the protocol packet, that its port 1 is a Cascade Port and the user VLAN of the device B are x+y.

604: A device D sends a protocol packet to the device A, carrying a user VLAN z and Uplink Port 1 information of the device D.

The device A may know, based on the protocol packet, that its port 2 is a Cascade Port and the user VLAN of the device D is z.

After the Cascade Port and the downstream VLAN are obtained, it is determined that a VLAN used by both users of a present device and users of a downstream device is a Common VLAN, a VLAN only used by users of a present device is a Local VLAN, and a VLAN not used by users of a present device but used by users of a downstream device is an Across VLAN. The VLAN topology learning process is completed and then the devices B, C, and D send protocol packets to the Uplink Ports regularly.

Figure 7:
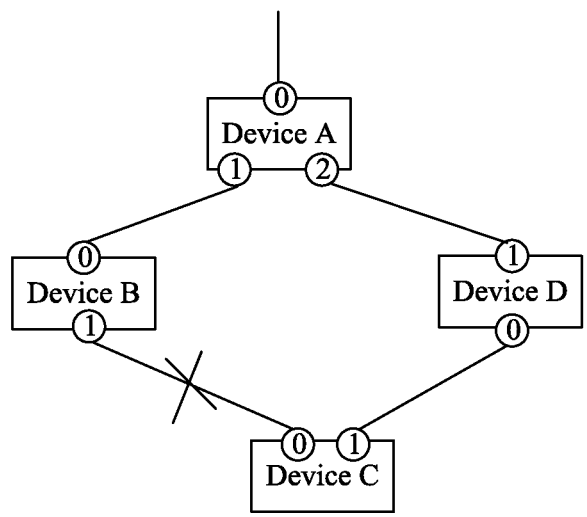
FIG. 7 is an architecture diagram of a tree network according to an embodiment of the present disclosure.
Figure 8:
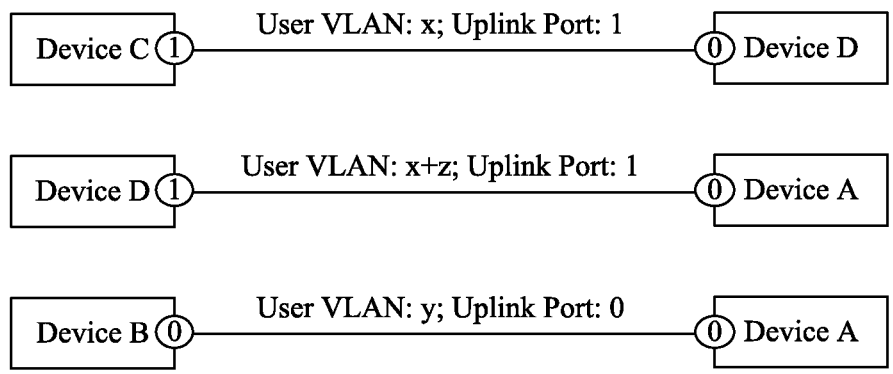
FIG. 8 is an STP-network-based flowchart according to an embodiment of the present disclosure.

It is assumed that the STP configuration changes, and a new DISCARDING port is shown in FIG. 7, that is, the port 0 of the device C is in the DISCARDING state, and the device A remains as the root bridge. The new port type and VLAN type learning process is shown in FIG. 8.

In another embodiment of the present disclosure, a third-party management device may obtain the downstream adjacency relationship of each device through the Simple Network Management Protocol (Simple Network Management Protocol, SNMP), generate the network topology diagram based on the obtained downstream adjacency relationships, and display the VLAN configuration information based on the VLAN lists. The third-party management device may also receive protocol packets sent by other devices and learn port types and classify VLAN of the devices based on the received protocol packets.

In the foregoing embodiments, a device passively receives a protocol packet sent by a downstream device and learns port types and classifies VLAN based on the protocol packet. In another embodiment of the present disclosure, a device may also use an active manner, namely, each device actively sends its user VLAN, and all the VLAN interact to form a network VLAN topology in the end, and may also add the VLAN topology information to an STP packet to cooperate with the operation of the STP protocol.

Because in the active manner the bottom device is not differentiated at first, a field must be added to the packet to indicate the bottom device, so as to enable other devices to differentiate an upstream topology from a downstream topology.

The greatest difference between the active manner and the passive manner is that, in the active manner each device actively sends a protocol packet to all ports and a device that receives the protocol packet updates its user VLAN and sends the protocol packet to all ports. Before receiving an identifier of the bottom device, because the device cannot differentiate between the upstream and the downstream, it only stores information such as a VLAN list and a port list received from each port (if port types such as the Uplink Port are manually configured, it is unnecessary to determine the identifier of the bottom device, which can reduce the impact on the network by a single point of failure); after receiving the identifier of the bottom device, the device learns the port types and VLAN types.

In the method provided by the embodiments, port types can be automatically learned and VLAN, which reduces manual intervention can be automatically classified, and after the port types are obtained and the VLAN are classified, VLAN information that can be added to each port type is configured based on delivered network configuration, which can optimize network performance.

Figure 9:
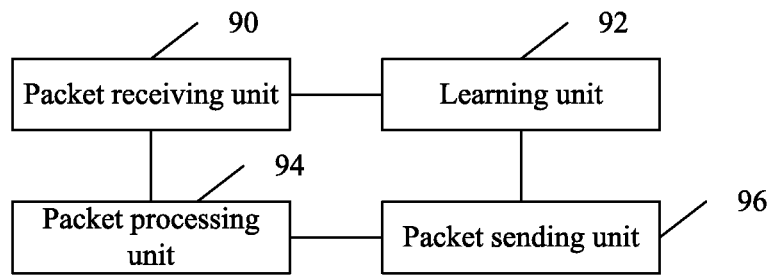
FIG. 9 is a structural diagram of a device according to an embodiment of the present disclosure.

An embodiment of the present disclosure provides a device for packet processing, which, as shown in FIG. 9, includes:

a packet receiving unit 90, configured to receive a protocol packet from a downstream device, where the protocol packet carries uplink port information of the downstream device and the user VLAN of the downstream device;

a learning unit 92, configured to learn port types of the present device based on the uplink port information and classify the user VLAN of the present device and the user VLAN of the downstream device based on the user VLAN of the downstream device, where for the details of the port type learning and VLAN classifying process of the learning unit 92, reference may be made to the foregoing description, which are not described here again; and a packet processing unit 94, configured to forward the received packet based on configuration information stored on the present device, where the port type or types to which each VLAN type can be added are specified in the configuration information.

For the content of the configuration information, reference may be made to the foregoing description.

The packet processing device may further include a packet sending unit 96, configured to send to ports a protocol packet carrying the port list and user VLAN of the present device.

The packet processing device provided in this embodiment may be an access device, such as a digital subscriber line access multiplexer (Digital Subscriber Line Access Multiplexer, DSLAM), an optical line terminal (Optical Line Terminal, OLT), or a routing device.

The device for packet processing provided by this embodiment can automatically learn port types and classify VLAN, which reduces manual intervention, and after the port types are obtained and the VLAN are classified, configure VLAN information that can be added to each port type based on delivered network configuration, which can optimize network performance.

Figure 10:
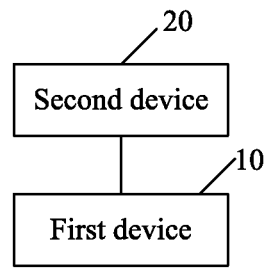
FIG. 10 is an architecture diagram of a system according to an embodiment of the present disclosure.

An embodiment of the present disclosure provides a system for packet processing, which, as shown in FIG. 10, includes:

a first device 10, configured to send a protocol packet to a second device 20, where the protocol packet carries uplink port information of the first device 10 and user virtual local area network VLAN of the first device 10; and a second device 20, configured to learn port types of the second device based on the uplink port information, classify the user VLAN of the second device and the user VLAN of the first device based on the user VLAN of the first device, and forward the received packet based on configuration information stored on the second device, where the port type or types to which each VLAN type can be added are specified in the configuration information.

The first and second devices provided by this embodiment may be DSLAMs, OLTs, or routing devices and the like.

In the system for packet processing provided by this embodiment, the second device can automatically learn port types and classify VLAN, which reduces manual intervention, and after the port types are obtained and the VLAN are classified, configure VLAN information that can be added to each port type based on delivered network configuration, which can optimize network performance.

What is claimed is:

1. A method for packet processing, comprising:
   receiving, by a network device, a protocol packet from a downstream device, wherein the protocol packet carries uplink port information of the downstream device and user virtual local area network (VLAN) of the downstream device;
   learning, by the network device, port types of the network device based on the uplink port information;
   classifying, by the network device, the user VLAN of the network device and the user VLAN of the downstream device based on the user VLAN of the downstream device; wherein classified VLAN types comprise a Local VLAN that is only used by users of the network device, an Across VLAN that is not used by users of the network device but used by users of the downstream device, and a Common VLAN that is used by both users of the network device and users of the downstream device; and
   forwarding, by the network device, the protocol packet received based on configuration information stored on the network device and according to the classified VLAN type of the user VLAN of the network device and the user VLAN of the downstream device, wherein the port type or types to which each VLAN type can be added are specified in the configuration information.

2. The method according to claim 1, wherein the port types of the network device comprise:
   a user port that is connected to the network device on a user side, an uplink port that is connected to an upper layer device, and a cascade port that is connected to the downstream device.

3. The method according to claim 1, wherein the learning port types of a local port based on the uplink port information comprises:
   learning that the port on the network device that is connected to the uplink port is a cascade port.

4. The method according to claim 1, wherein the classifying the user VLAN of the network device and the user VLAN of the downstream device based on the user VLAN of the downstream device specifically comprises:
   comparing the user VLAN of the network device with the user VLAN of the downstream device, and identifying the types of the user VLAN of the network device and the user VLAN of the downstream device.

5. The method according to claim 3, wherein the method further comprises:
   sending, through the uplink port of the network device, the protocol packet that carries uplink port information of the network device and the user VLAN of the network device.

6. The method according to claim 1, wherein that the port type or types to which each VLAN type can be added are specified in the configuration information specifically comprises:

adding the Local VLAN to an uplink port, and adding the Across VLAN and the Common VLAN to a corresponding uplink port and cascade port.

7. The method according to claim 1, wherein in the configuration information, port type attributes may further be specified, which comprises: configuring layer 2 isolation between a cascade port and a user port and/or disabling a function of the cascade port of learning a Media Access Control MAC address of the Across VLAN.

8. The method according to claim 1, wherein the configuration information may further comprise: only receiving the protocol packet, from a user port or an uplink port, carrying the Common VLAN or the Local VLAN.

9. A device for packet processing, comprising:
a packet receiving unit, configured to receive a protocol packet from a downstream device, wherein the protocol packet carries uplink port information of the downstream device and user virtual local area network VLAN of the downstream device;
a processor; and
a non-transitory computer-readable storage medium storing a program to be executed by the processor, the program including instructions to:
learn port types of the device based on the uplink port information, and classify the user VLAN of the device and the user VLAN of the downstream device based on the user VLAN of the downstream device; wherein classified VLAN types comprise a Local VLAN that is only used by users of the device, an Across VLAN that is not used by users of the device but used by users of the downstream device, and a Common VLAN that is used by both users of the device and users of the downstream device; and
forward the protocol packet received based on configuration information stored on the device and according to the classified VLAN type of the user VLAN of the device and the user VLAN of the downstream device, wherein the port type or types to which each VLAN type can be added are specified in the configuration information.

10. The device for packet processing according to claim 9, wherein the program further includes instructions to send to all ports the protocol packet carrying a port list and the user VLAN of the downstream device.

11. A system for packet processing, comprising:
a first device; and
a second device;
wherein the first device is configured to send a protocol packet to the second device, wherein the protocol packet carries uplink port information of the first device and user virtual local area network VLAN of the first device; and
wherein the second device is configured to learn port types of the second device based on the uplink port information, classify the user VLAN of the second device and the user VLAN of the first device based on the user VLAN of the first device, and forward the protocol packet received based on configuration information stored on the second device and according to a classified VLAN type of the user VLAN of the second device and the user VLAN of the first device, wherein the port type or types to which each VLAN type can be added are specified in the configuration information; and
wherein classified VLAN types comprise a Local VLAN that is only used by users of the second device, an Across VLAN that is not used by users of the second device but used by users of the first device, and a Common VLAN that is used by both users of the second device and users of the first device.

* * * * *